United States Patent
Adiga et al.

(10) Patent No.: US 11,599,580 B2
(45) Date of Patent: Mar. 7, 2023

(54) METHOD AND SYSTEM TO EXTRACT DOMAIN CONCEPTS TO CREATE DOMAIN DICTIONARIES AND ONTOLOGIES

(71) Applicant: Tata Consultancy Services Limited, Mumbai (IN)

(72) Inventors: Deepa Tavargeri Adiga, Pune (IN); Mukul Malik, Pune (IN); Vaibhav Sharma, Pune (IN); Vivek Balaraman, Pune (IN); Mayuri Duggirala, Pune (IN); Maitry Bhavsar, Pune (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 421 days.

(21) Appl. No.: 16/451,688

(22) Filed: Jun. 25, 2019

(65) Prior Publication Data
US 2020/0175068 A1 Jun. 4, 2020

(30) Foreign Application Priority Data
Nov. 29, 2018 (IN) .............................. 201821045159

(51) Int. Cl.
*G06F 16/906* (2019.01)
*G06F 16/903* (2019.01)
*G06F 40/295* (2020.01)

(52) U.S. Cl.
CPC ...... *G06F 16/906* (2019.01); *G06F 16/90344* (2019.01); *G06F 40/295* (2020.01)

(58) Field of Classification Search
CPC . G06F 16/906; G06F 16/90344; G06F 40/295
(Continued)

(56) References Cited

U.S. PATENT DOCUMENTS 6,154,213 A * 11/2000 Rennison ................ G06F 16/34
715/854
6,510,406 B1 * 1/2003 Marchisio ............. G06F 40/268
704/9

(Continued)

FOREIGN PATENT DOCUMENTS

| EP | 3011482 | 4/2016 | | |
| WO | WO-2011035425 A1 * | 3/2011 | ......... | G06F 17/2775 |
| WO | WO 2014/205046 | 12/2014 | | |

OTHER PUBLICATIONS

Burns, G.A.P.C. et al. (Dec. 2008). "Intelligent Approaches to Mining the Primary Research Literature: Techniques, Systems, and Examples," *Computational Intelligence in Medical Informatics* (37 pages).

(Continued)

*Primary Examiner* — Alex Gofman
*Assistant Examiner* — Michael Le
(74) *Attorney, Agent, or Firm* — Finnegan, Henderson, Farabow, Garrett & Dunner, LLP (57) ABSTRACT

Method and system to extract domain concepts to create domain dictionaries and ontologies comprises collecting a plurality of reference papers and further classifying the collected plurality of reference papers as relevant and irrelevant. Each of the 'relevant' reference papers is further processed by the system, during which the system identifies relevant sections from each document and further processes data in the relevant sections to extract required information and also to identify a relationship between different extracted information, which is further used to create domain dictionaries and ontologies.

9 Claims, 6 Drawing Sheets

(58) Field of Classification Search
USPC .......................................................... 707/737
See application file for complete search history.

(56) References Cited

U.S. PATENT DOCUMENTS

| | | | |
|---|---|---|---|
| 6,609,132 B1* | 8/2003 | White | G06F 16/288 |
| 6,981,040 B1* | 12/2005 | Konig | G06N 20/00 |
| 7,440,931 B1* | 10/2008 | Suzuki | G09B 7/00 |
| | | | 706/46 |
| 7,970,808 B2* | 6/2011 | Konig | G06F 40/30 |
| | | | 707/962 |
| 8,554,701 B1* | 10/2013 | Dillard | G06F 40/30 |
| | | | 706/12 |
| 8,630,975 B1* | 1/2014 | Guo | G06F 16/24578 |
| | | | 707/608 |
| 8,949,242 B1* | 2/2015 | Lin | G06F 16/36 |
| | | | 707/739 |
| 9,195,640 B1* | 11/2015 | Donneau-Golencer | |
| | | | G06F 40/30 |
| 9,195,647 B1* | 11/2015 | Zhang | G06F 40/284 |
| 9,201,863 B2* | 12/2015 | Duong-Van | G06F 40/30 |
| 9,348,920 B1* | 5/2016 | Kesin | G06N 20/00 |
| 9,361,377 B1* | 6/2016 | Azari | G06F 16/335 |
| 9,589,184 B1* | 3/2017 | Castillo | G06F 16/957 |
| 9,594,831 B2* | 3/2017 | Wang | G06F 40/295 |
| 9,880,998 B1* | 1/2018 | Zhang | G06F 40/247 |
| 10,242,320 B1* | 3/2019 | Elkholy | G06F 40/295 |
| 11,048,879 B2* | 6/2021 | Buhrmann | G06N 5/022 |
| 2002/0120451 A1* | 8/2002 | Kato | G10L 15/1822 |
| | | | 704/258 |
| 2002/0184267 A1* | 12/2002 | Nakao | G06F 16/345 |
| | | | 715/255 |
| 2002/0188599 A1* | 12/2002 | McGreevy | G06F 16/2465 |
| 2004/0107088 A1* | 6/2004 | Budzinski | G06F 16/3334 |
| | | | 704/10 |
| 2006/0009966 A1* | 1/2006 | Johnson | G06F 40/205 |
| | | | 704/10 |
| 2006/0167931 A1* | 7/2006 | Bobick | G06F 16/36 |
| 2006/0179041 A1* | 8/2006 | Ohi | G06F 16/367 |
| 2006/0217818 A1* | 9/2006 | Fujiwara | G06N 5/04 |
| | | | 700/16 |
| 2006/0288124 A1* | 12/2006 | Kraft | G06F 16/951 |
| | | | 707/E17.108 |
| 2007/0067157 A1* | 3/2007 | Kaku | G06F 40/289 |
| | | | 704/10 |
| 2007/0067289 A1* | 3/2007 | Novak | G06F 40/289 |
| 2007/0094042 A1* | 4/2007 | Ramer | G06Q 30/0201 |
| | | | 705/1.1 |
| 2008/0097968 A1* | 4/2008 | Delgado | G06F 16/36 |
| 2008/0140684 A1* | 6/2008 | O'Reilly | G06F 16/353 |
| 2008/0228675 A1* | 9/2008 | Duffy | G06F 40/295 |
| | | | 706/10 |
| 2009/0024598 A1* | 1/2009 | Xie | G06F 16/3349 |
| 2009/0094043 A1* | 4/2009 | Marvit | G06F 16/313 |
| 2009/0192968 A1* | 7/2009 | Tunstall-Pedoe | G06N 5/022 |
| | | | 706/47 |
| 2009/0210406 A1* | 8/2009 | Freire | G06F 16/951 |
| 2009/0210407 A1* | 8/2009 | Freire | G06F 16/951 |
| 2010/0153324 A1* | 6/2010 | Downs | G06F 40/258 |
| | | | 706/21 |
| 2010/0169299 A1* | 7/2010 | Pollara | G06F 40/284 |
| | | | 707/708 |
| 2010/0169359 A1* | 7/2010 | Barrett | G06F 16/313 |
| | | | 707/769 |
| 2010/0280985 A1* | 11/2010 | Duchon | G06Q 10/10 |
| | | | 706/52 |
| 2010/0287162 A1* | 11/2010 | Shirwadkar | G06F 16/345 |
| | | | 707/750 |
| 2010/0293166 A1* | 11/2010 | Hatami-Hanza | G06F 16/278 |
| | | | 707/739 |
| 2011/0022941 A1* | 1/2011 | Osborne | G06F 16/367 |
| | | | 715/230 |
| 2011/0219001 A1* | 9/2011 | Marik | G06F 16/00 |
| | | | 707/738 |
| 2011/0295612 A1* | 12/2011 | Donneau-Golencer | |
| | | | G06Q 30/02 |
| | | | 705/1.1 |
| 2011/0301941 A1* | 12/2011 | De Vocht | G06F 16/3344 |
| | | | 704/9 |
| 2012/0011428 A1* | 1/2012 | Chisholm | G06F 16/313 |
| | | | 715/230 |
| 2012/0030201 A1* | 2/2012 | Pickering | G06F 16/334 |
| | | | 707/E17.014 |
| 2012/0078918 A1* | 3/2012 | Somasundaran | G06F 40/284 |
| | | | 707/748 |
| 2013/0138428 A1* | 5/2013 | Chandramouli | G06F 40/30 |
| | | | 704/9 |
| 2013/0144605 A1 | 6/2013 | Brager et al. | |
| 2013/0159306 A1* | 6/2013 | Janssen, Jr. | G06F 16/3338 |
| | | | 707/737 |
| 2014/0052667 A1* | 2/2014 | Lundberg | G06Q 10/06 |
| | | | 705/36 R |
| 2014/0278448 A1* | 9/2014 | Sadeghi | G16H 15/00 |
| | | | 705/2 |
| 2014/0344274 A1* | 11/2014 | Kido | G06F 16/285 |
| | | | 707/737 |
| 2014/0372102 A1* | 12/2014 | Hagege | G06F 40/295 |
| | | | 704/9 |
| 2016/0140210 A1* | 5/2016 | Pendyala | G06F 40/205 |
| | | | 707/737 |
| 2016/0180217 A1* | 6/2016 | Boston | G06F 16/24578 |
| | | | 706/46 |
| 2016/0232456 A1* | 8/2016 | Jain | G06N 20/00 |
| 2017/0053025 A1* | 2/2017 | De Sousa Webber | |
| | | | G06F 16/358 |
| 2017/0193291 A1* | 7/2017 | Lucchese | G06K 9/6255 |
| 2017/0193393 A1* | 7/2017 | Contractor | G06N 5/022 |
| 2017/0300565 A1* | 10/2017 | Calapodescu | G06F 16/278 |
| 2017/0351749 A1* | 12/2017 | Quirk | G06F 16/316 |
| 2017/0364587 A1* | 12/2017 | Krishnamurthy | G06F 40/284 |
| 2018/0052816 A1* | 2/2018 | Ma | G06F 40/30 |
| 2018/0082183 A1* | 3/2018 | Hertz | G06N 5/00 |
| 2018/0113676 A1* | 4/2018 | De Sousa Webber | |
| | | | G06F 40/279 |
| 2018/0150753 A1* | 5/2018 | Farrell | G06F 40/30 |
| 2018/0189292 A1* | 7/2018 | Grace, Jr. | G06F 16/93 |
| 2018/0196881 A1* | 7/2018 | Lundin | G06N 3/0445 |
| 2018/0365229 A1* | 12/2018 | Buhrmann | G06F 40/247 |
| 2019/0005395 A1* | 1/2019 | Dutkowski | G06N 20/00 |
| 2019/0325062 A1* | 10/2019 | Rogulenko | G06F 16/2343 |
| 2019/0347297 A1* | 11/2019 | Galitsky | G06F 16/90332 |
| 2020/0097597 A1* | 3/2020 | Lourentzou | G06F 40/211 |
| 2020/0159783 A1* | 5/2020 | Shlyunkin | G06F 16/2272 |
| 2020/0342178 A1* | 10/2020 | Ding | G06N 5/022 |

OTHER PUBLICATIONS

Peng, F. et al. (Jul. 2006). "Accurate Information Extraction from Research Papers using Conditional Random Fields," *Journal Information Processing and Management: An International Journal*, vol. 42, No. 4 (8 pages).

\* cited by examiner

METHOD AND SYSTEM TO EXTRACT DOMAIN CONCEPTS TO CREATE DOMAIN DICTIONARIES AND ONTOLOGIES

PRIORITY CLAIM

This U.S. patent application claims priority under 35 U.S.C. § 119 to Indian Application No. 201821045159, filed on Nov. 29, 2018. The entire contents of the aforementioned application are incorporated herein by reference.

TECHNICAL FIELD

This disclosure relates generally to data analysis, and more particularly to extract domain concepts to create domain dictionaries and ontologies.

BACKGROUND

Data analysis is performed for various applications. For example, behavioral science, which refers to scientific study of human and animal behavior, involves considerable amount of data analysis to study/examine behavioral data and to arrive at conclusions. The data analyzed in the behavioral science domain involve various theories as well as behavioral data collected from subjects. Many such theories, historic data pertaining to past researches, and so on may be available in public domain in various forms such as but not limited to scientific papers, articles, and documents. As the internet is extremely popular now, such data may be available in abundance.

The inventors here have recognized several technical problems with such conventional systems, as explained below. A single database may contain many theories which may be same/similar, and if a researcher goes through both, that results in wastage of time. Further, such publicly available databases contain a set of ontologies pertaining to specific research areas. However, relationships between different ontologies may not be clearly defined. As a result, a person who is researching may find it difficult to identify the appropriate data/contents as well as connection/relationships between different theories and ontologies, at the time of research. For example, consider the variables role conflict and job satisfaction. These variables may or may not have interdependency (relationship), according to specific circumstances. However, as long as a user is not aware of the relationship, he/she may not be able to interpret the scenario and associated contents properly. Similarly, in domains such as but not limited to behavioral science, quite a lot of such variables/parameters exist, and knowing the relationship between such variables/parameters would be critical from a user perspective.

SUMMARY

Embodiments of the present disclosure present technological improvements as solutions to one or more of the above-mentioned technical problems recognized by the inventors in conventional systems. For example, in one embodiment, a a method for data extraction is provided. In this method, a plurality of reference papers are collected from at least one associated source, using at least a plurality of crawlers. Further, the plurality of reference papers are classified as relevant and irrelevant. Each relevant reference papers is further processed, wherein the processing of the relevant reference paper involves identifying a plurality of relevant sections in the relevant reference paper; and processing the plurality of relevant sections. The processing of the plurality of relevant sections involve: selecting a plurality of candidate sentences from each relevant section; identifying a plurality of clauses from each of the plurality of candidate sentences; determining whether each of the plurality of clauses contain at least one 'relation term'; and extracting a plurality of qualitative relations and a plurality of quantitative relations from each clause determined as containing the at least one relation term.

In another embodiment, a system for data extraction is provided. The system includes one or more hardware processors; one or more communication interfaces; a relation miner module; and one or more memory modules storing a plurality of instructions. The plurality of instructions when executed cause the one or more hardware processors to collect a plurality of reference papers from at least one associated source, using at least a plurality of crawlers; classify the plurality of reference papers as relevant and irrelevant; identify a plurality of relevant sections in the relevant reference paper; and process the plurality of relevant sections. Processing of the plurality of relevant sections involve: selecting a plurality of candidate sentences from each relevant section; identifying a plurality of clauses from each of the plurality of candidate sentences; determining whether each of the plurality of clauses contain at least one 'relation term' using the relation miner module; and extracting a plurality of qualitative relations and a plurality of quantitative relations from each clause determined as containing the at least one relation term using the relation miner module.

In yet another embodiment, a non-transitory computer readable medium for data extraction is provided. The non-transitory computer readable medium collects a plurality of reference papers from at least one associated source, using at least a plurality of crawlers. Further, the plurality of reference papers are classified as relevant and irrelevant. Each relevant reference papers is further processed, wherein the processing of the relevant reference paper involves identifying a plurality of relevant sections in the relevant reference paper; and processing the plurality of relevant sections. The processing of the plurality of relevant sections involve: selecting a plurality of candidate sentences from each relevant section; identifying a plurality of clauses from each of the plurality of candidate sentences; determining whether each of the plurality of clauses contain at least one 'relation term'; and extracting a plurality of qualitative relations and a plurality of quantitative relations from each clause determined as containing the at least one relation term.

The extracted domain concepts such as qualitative relations and quantitative relations, along with any other associated details are used to create domain dictionaries and ontologies.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
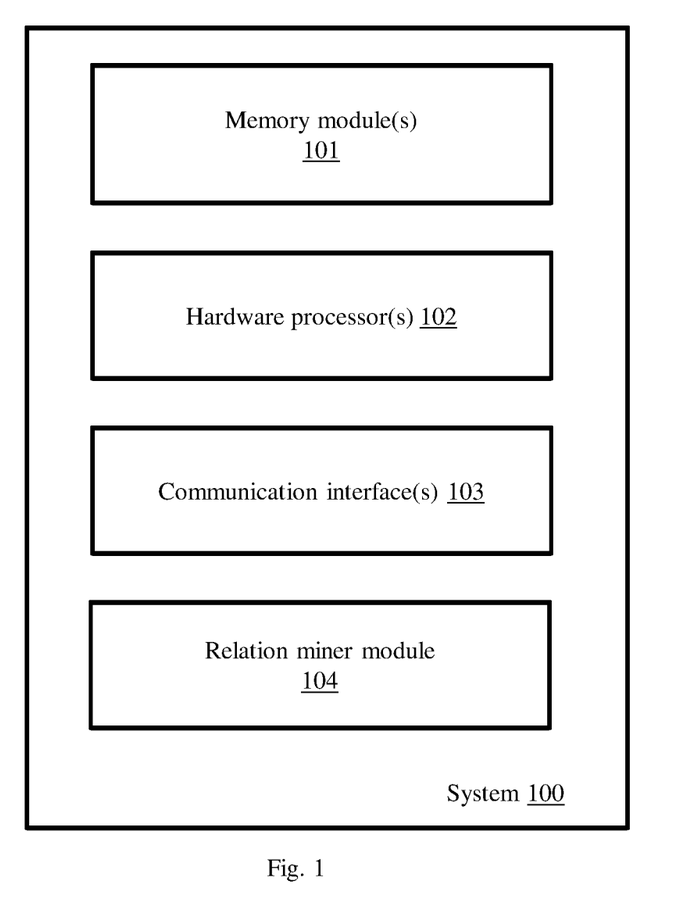
FIG. 1 illustrates an exemplary system for data extraction according to some embodiments of the present disclosure.

FIG. 1 illustrates an exemplary system (100) for data extraction according to some embodiments of the present disclosure. The system (100) includes one or more memory modules (101), one or more hardware processors (102), one or more communication interfaces (103), and a relation miner module 104.

The memory module(s) 101 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, one or more modules (not shown) of the system 100 can be stored in the memory 101. The memory module(s) 101 are further configured to store a plurality of instructions, which when executed, cause the one or more hardware processor(s) 102 to perform different actions associated with the free space identification being handled by the system 100. The memory module(s) 101 can be further configured to store any data, associated with the data extraction being handled by the system 100. For example the data such as but not limited to reference papers collected, corresponding parameters extracted, qualitative, quantitative, and any other data identified, and corresponding domain dictionaries and ontologies formed can be stored in the one or more memory modules 101.

The one or more hardware processors 102 can be implemented as one or more microprocessors, microcomputers, microcontrollers, digital signal processors, central processing units, state machines, graphics controllers, logic circuitries, and/or any devices that manipulate signals based on operational instructions. Among other capabilities, the processor(s) are configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like. The one or more hardware processors 102 are configured to perform data and control signal processing, at different stages of the free space detection, as required.

The communication interface(s) 103 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the communication interface(s) 103 can include one or more ports for connecting a number of devices to one another or to another server. The communication interface(s) can be configured to provide one or more channels with appropriate protocols, for the system 100 to communicate with one or more external systems. For example, the communication interface(s) 103 interacts and collects inputs required for the free space detection, from one or more sensors, wherein the sensors may or may not be part of the system 100. The communication interface(s) 103 may further provide appropriate user interface(s) for an authorized user to interact with the system 100. The communication interface(s) 103 can be further configured to provide one or more channels for different components of the system 100 to interact with each other and perform data and/or control transfer.

The relation miner module 104 is configured to execute one or more of the below mentioned steps for identifying qualitative and quantitative relations, using the one or more of the hardware processors 102, in response to execution of one or more of the plurality of instructions stored in the memory module(s) 101. The relation miner module 104 collects a plurality of reference papers with respect to any field/area in which the research is being performed, so as to build a searchable index. The reference papers may be collected from any suitable source such as websites, and may be in any suitable format. The reference papers may contain data such as but not limited to general definitions, theories, past research, results of past research and so on, which can be used to build the searchable index. The relation miner can use any suitable mechanism to collect/generate the reference papers. For example, one or more web crawlers may be used by the relation miner 104 to collect the reference data and/or papers. The crawlers crawl through each page, and if any page has link(s) to other pages, also crawls through the other pages to collect data. The crawlers may also download the reference papers being crawled and store in one or more appropriate databases in the memory module(s) 101. The relation miner 104 may terminate the data collection when a threshold in terms of amount of collected data is reached, and/or when a command to stop the data collection is provided by a user, and/or based on any such conditions as configured with the relation miner 104.

As the reference papers are collected in bulk, some of the collected reference papers may be relevant and the rest may be irrelevant (with respect to the domain/field in which the research is being conducted). So the relation miner 104 processes the reference papers and classifies each reference paper as 'relevant' or 'irrelevant'. In an embodiment, whole content of each of the reference papers is analyzed by the relation miner 104 to classify the reference papers as 'relevant' or 'irrelevant'. However, analyzing entire content of each reference paper may be time-consuming and can increase load of the system 100. As a result, in another embodiment, the relation miner 104 analyzes only selected portion(s) of each reference paper. For example, the relation miner 104 can be configured to analyze contents of 'abstract' section of each reference paper, as the abstract section in each reference document may contain important information with respect to research data elaborated in the reference paper. In an embodiment, the relation miner 104 uses one or more 'classifiers' which are configured to classify the reference papers as relevant or irrelevant. The classifiers are trained using appropriate training data (such as abstracts, labelled data, annotated data and so on). The training data is pre-processed before using it to train the classifiers. Pre-processing of the training data involves:

1. Converting the data into lower case in order to reduce the size of the vocabulary although some distinctions are lost during this process. For example, one cannot distinguish between the fruit "apple" vs the company "Apple".
2. Removing whitespace and punctuation from the transformed (lower case) data and removing all the numbers and special characters from the data.
3. Removing commonly most occurring words (for example, stop-words such as but not limited to a, the, is, which, and 'can') in order to further reduce vocabulary size in the data.
4. Stemming each word to its root form in order to have better classification.

After pre-processing the data, the data is converted to feature vectors for further processing. The system 100 may use any suitable technique (for example, Frequency-Inverse Document Frequency (Tf-Idf) technique may be used) to convert the data into a feature matrix, and for further generating the feature vectors from the feature matrix.

After classifying the reference papers as 'relevant' and 'irrelevant', the relation miner module 104 discards the irrelevant reference papers and further processes the relevant reference papers.

Even though a reference paper may have been classified as 'relevant', not all sections in the reference paper may contain relevant data. So in the next step, the relation miner module 104 identifies relevant sections in each of the plurality relevant reference papers. In order to classify sections in each relevant reference paper as relevant or irrelevant, the relation miner 104 uses one or more classifiers, wherein the one or more classifiers are trained using appropriate training dataset. The classifier(s) being used may split each relevant reference paper to multiple sections to analyze further. The relation miner 104 may use any suitable technique (for example, Frequency-Inverse Document Frequency (Tf-Idf) technique to generate the training data.

After identifying the relevant sections, the relation miner 104 processes data in the relevant sections. In an embodiment, the relation miner 104 processes the data at a clause level in candidate sentences. The candidate sentence is a sentence that contains one or more 'relation terms'. At this stage, the relation miner 104 checks if a clause being analyzed contains a relation term. Some examples of the relation term are correlate, relate, associate, impact, affect, effect and so on. If the clause is identified as containing the relation term, then the relation miner 104 extracts one or more qualitative relations and one or more quantitative relations from the clause. However, before identifying the qualitative and quantitative relations, the relation miner 104 pre-processes the data in the relevant sections. The pre-processing of the data in the relevant sections involves the following steps:

1. Abbreviation expansion
2. Co-reference resolution
3. Hypernym-Hyponym replacements
4. Pre-processing to extract Quantitative Relations
5. Conversion of complex sentence into simple sentences and cleaning of special characters.

Abbreviation Expansion:

During the pre-processing, candidate abbreviations and expansion pairs are extracted and stored in an abbreviations repository in the memory module 101. This is done by identifying patterns of occurrences of abbreviation and their respective expansion pairs. For example consider the statement: This paper presents a context dependent valuation (CDV) model of decision making under risk, where the valuation of a gamble depends not only on its own probability-outcome structure but also on the other gambles that it is compared with. Here, CDV abbreviation has an expansion context dependent valuation. The Abbreviation repository was utilized to expand the abbreviations found in the relevant sections.

Co-Reference Resolution:

Mentions in the data such as but not limited to "it, them, and they" are processed using appropriate technique (for example, a Stanford Corenlp parser).

Hypernym-Hyponym Replacements:

A candidate set of for the Hypernym-Hyponyms replacements of the data is created using any suitable technique. Typically, the Hyponyms are stated using specific phrases across the reference papers. Such phrases are identified and listed. The hyponyms are usually represented using one or more of "such as, for example, (e.g.), for instance, to name a few, viz."

To understand these steps in detail, consider the example below:

Consider the statement "In their studies, Jeannerod and colleagues demonstrated that imagining complex actions (such as running, rowing or weightlifting) has neurophysiological consequences that are largely comparable to those of actually engaging in those actions. Running, Rowing, Weightlifting are kind of complex actions and hence complex actions is the hyponym and the activities, running, rowing, weightlifting are the hypernyms of the complex actions".

To extract Abbreviation-Expansion and Hypernym-Hyponyms pairs, a "Lexico Syntactic patterns" made up of combination of keywords and special characters is used.

Pre-Processing to Extract Quantitative Relations

The Relation Quantifiers (if mentioned in relation statement) are found in various forms such as ($r=0.51$, $p<0.01$), ($=-0.42$, $p<0.01$), ($r=0.76$), ($rho=-0.21$, $p<0.001$), ($b=0.21$, $p<0.01$), (correlation coefficient$=0.224$), and so on.

Figure 3A:
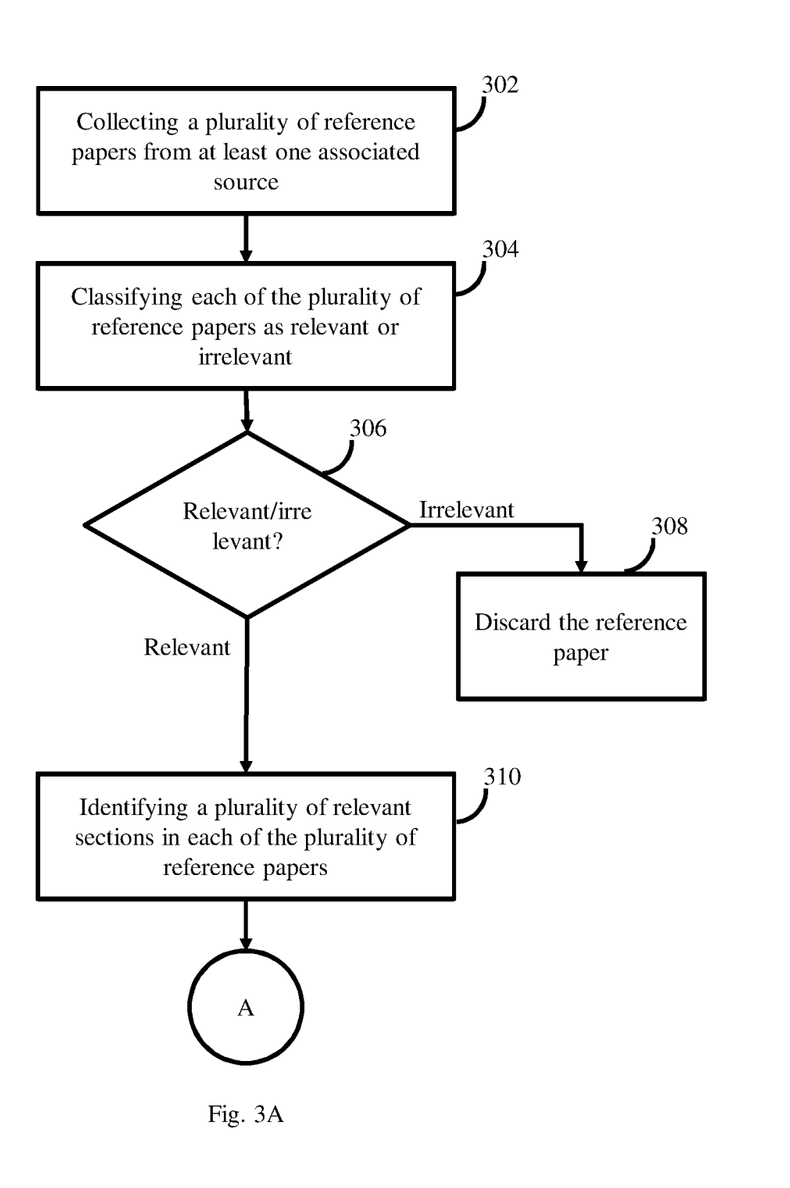
FIGS. 3A and 3B are a flow diagram depicting steps involved in the process of extracting data using the system of FIG. 1, in accordance with some embodiments of the present disclosure.

Varying forms of quantifiers induce erroneous information, while extracting components of relation statement. During pre-processing, the quantifiers in the sentence are replaced with tags and a quantifier's repository is maintained for the sentence we are dealing with. For example consider the behaviour statement in a sentence as shown in FIG. 3. The quantifier ($r=-0.284$, $p<0.01$) is tagged as (A).

Role conflict is negatively correlated with job satisfaction (A). Then the sentence's quantifier repository is:

TABLE 1

Quantifier repository for a sentence

| Tags | Values |
|---|---|
| A | (r = −.284, p < .01 ) |

This information is further used while extracting a plurality of Quantitative Relations.

Conversion of Complex Sentences into Simple Sentences and Cleaning of Special Characters In this step references mentioned in brackets are cleared, unwanted text from the sentence is trimmed, and the sentence may be split to two or more parts. Sentences are split in order to convert a complex sentences into a simple ones. The sentence can be split if it contained phrases such as ", while", ", and", ", where as", ";". Converting a complex sentence in to a simple one helps in extracting better results from the simple sentences.

Special characters such as ^, $, `, ~, also are cleaned/removed from the sentence, as presence of such special characters can induce errors while extracting data from the sentence. The cleaned sentence is further converted into lowercase for further processing.

Further, the relation miner module 104 extracts qualitative as well as quantitative relations from each sentence being processed. The processes for extracting the qualitative and quantitative relations are explained below:

Qualitative Relation Extraction

In this process, the relation miner module 104 determines/identifies type of a relation statement.

Relation statement is a statement that indicates bivariate or multivariate relations defined between behavioral variables. The relation statement type may be 'bidirectional' or 'uni-directional'. A unidirectional relation specifies direction of the relation from predictor to response variables. When one variable is causing some effect on another variable then it becomes directional relationship where variable positions are not inter-changeable. For example Job satisfaction affects productivity. Unidirectional relations are defined using verbs such as but not limited to effect, affect, impact, and cause. Bidirectional relation is defined as a relationship in both ways i.e. forward as well as back word. Which means the variables affect one another equally. In this kind of relation, variables are interchangeable. For example, job satisfaction is correlated with job performance.

Further, relation miner considers position of the relation term in the relation statement. Based on the position of the relation term, relation statement is classified as ARB type, ABR type and RAB type where "R" is the relation term and "A & B" are the behaviour variables. The steps being executed by the relation miner module 104 for extracting the qualitative relation for the bidirectional and uni-directional types is given below:

If the Relation Term is Bidirectional then
    Check the type of Relation Statement
        If Relation Statement type is Variable1 Relation Term Variable2(ARB) then Variable1=Subject+dependencies Variable2=Object+dependencies Relation=Relation Term+Relation Modifiers         If Relation Statement type is Variable1 Variable2 Relation Term(ABR) then
            Extract Variables from the Subject & its respective dependencies Relation=Relation Term+Relation Modifiers         If Relation Statement type is Relation Term Variable1 Variable2 (RAB) then
            Extract Variables from the Object & its respective dependencies Relation=Relation Term+Relation Modifiers If the Relation Term is Unidirectional then
    Extract Variables and Relation depending on the Relation Term in the clause Further, a Behavior Relation repository is populated with the extracted Variables (also referred to as 'behaviour variables') and Relations (also referred to as 'behaviour relations') by handling conjunctions.

In various embodiments, based on the relation term, the relation miner module 104 uses different types of dependencies to extract variables and relations. A two stage dependency recursion process may be used for finding whole variable. In this process, at stage one, a main word of the variable is found and in the second stage, dependent(s) of the main word is found to get whole variable. For example, in bidirectional type relation, with term "correlated" and type ARB, for finding the main word, "nsubj" may be checked for one variable and "nmod:with" or "nmod:to" for another variable. Further for finding dependents of the main word, dependencies such as "nmod:*", "compound", "amod", "advmod", "case" can be used for both the variables.

For finding whole relation term (by finding relation term dependents), dependencies such as "neg","aux","amod", "advmod" dependencies in a recursive manner. Table below shows the dependencies for finding variables for each kind of relations:

TABLE 2

List of relation terms and respective dependencies of interest

| Type of relation | Relation Terms | Variable1 stage1 dependencies | Variable1 stage2 dependencies | Variable2 stage1 dependencies | Variable1 stage2 dependencies |
|---|---|---|---|---|---|
| Bidirectional | correlate, associate, relate | 'nsubj', 'nmodagent' | 'nmod:of', 'nmod:on', 'compound', 'amod', 'nmod:in', 'case' | nsubjpass, dobj, 'nmod', 'nummod', 'nmod:to', 'nmod:with' | 'nmod:of', 'nmod:on', 'compound', 'amod', 'nmod:in', 'case' |

TABLE 2-continued

List of relation terms and respective dependencies of interest

| Type of relation | Relation Terms | Variable1 stage1 dependencies | Variable1 stage2 dependencies | Variable2 stage1 dependencies | Variable1 stage2 dependencies |
|---|---|---|---|---|---|
| Unidirectional -TypeA | Lead | 'nsubj' | 'nummod', 'compound', 'amod', 'advmod', 'nmod:*' | nmod:to, xcomp, dobj | 'nummod', 'compound', 'amod', 'advmod', 'nmod:*', 'xcomp', 'dobj' |
| Unidirectional -TypeB | affect, influence, increase, decrease | 'nsubj', 'nsubj:xsubj', 'nmod:agent', 'agent' | 'nummod', 'compound', 'amod', 'advmod', 'nmod:*', 'acl:', 'advcl:', 'mark' | 'dobj', 'nsubjpass' | 'nummod', 'compound', 'amod', 'advmod', 'nmod:*', 'xcomp', 'acl:', 'advcl:', 'xcomp', 'mark' |
| Unidirectional -TypeC | impact, effect | 'nsubj', 'nsubj:xsubj', 'nmod:agent', 'agent' | 'nummod', 'compound', 'amod', 'advmod', 'nmod:*', 'acl:', 'advcl:', 'dep', 'mark' | 'nmod:on', 'acl:on', 'advcl:on' | 'nummod', 'compound', 'amod', 'advmod', 'nmod:*', 'acl:', 'advcl:', 'dobj', 'dep', 'mark', 'xcomp' |

Quantitative Relation Extraction

In this step for a given relation statement, relation quantifiers such as strength, confidence, and mean values (if any) are extracted by the relation miner module 104, using syntactic dependency parsing and a set of "lexico syntactic patterns". At this stage, the relation minder module 104 may use tags in a quantifier repository stored in the memory module(s) 101 to identify and extract the values.

The tagged values are linked to the Behavior variables with the dependency, "appos". The quantifiers are extracted by the relation miner module 104 and are attached to the Behavior variable that it is linked to. Hence completing the components of Behavior Relation. i.e., Variables, Qualitative Relations and Relation Quantifiers. Regular expressions (RegEx) may be used by the relation miner module 104 to extract strength, confidence and other relevant values from the text. Thus, post Relation Extraction, structured information formed from the behavior relation is presented in table 3.

Relation Statement: According to a study considered, role conflict is negatively correlated with job satisfaction (r=−0.284, p<0.01).

TABLE 3

Extracted components of a relation Statement

| Variable1 | Variable2 | Qualitative Relation | Strength | Confidence |
|---|---|---|---|---|
| Role Conflict | Job Satisfaction | is negatively correlated with | −.284 | P < .01 |

The extracted information is then stored as a raw relation along with the relation statement, paper id and context of the relation, in an appropriate database in the memory module(s) 101.

The system 100 can be configured to process bivariate and trivariate relations as well. The bivariate relations indicate a relationship between two different variables whereas the trivarite relations take into account the relationship between three variables. For example consider following excerpt from a Behavioural Science past literature:

"Perceived niceness partially mediated the effect of the Ask manipulation on both male and female evaluators willingness to work with the female candidate, z=2.19, p=0.03 for male evaluators and z=4.82, p<0.001 for female evaluators (Sobel, 1982). There was no direct correlation between the participants' femininity scores and their propensity to negotiate. Legitimacy of request was positively correlated with relational (r=0.40) and deferential (r=0.43) and negatively correlated with aggressive (r=−0.37)."

From the above paragraph, the relation miner module 104 extracts following set of bivariate and trivariate relations and its different components:

TABLE 4

Extracted structured repository of behavioral relations depicting bivariate and trivariate relations.

| Variable 1 | Variable 2 | Qualitative Relation | Mediating/ moderating Relation | Mediating/ moderating Variables | Strength | Confidence |
|---|---|---|---|---|---|---|
| task manipulation | male evaluators willingness to work | the effect | partially mediated | Perceived niceness | z = 2.19 | p = .03 |

TABLE 4-continued

Extracted structured repository of behavioral relations depicting bivariate and trivariate relations.

| Variable 1 | Variable 2 | Qualitative Relation | Mediating/ moderating Relation | Mediating/ moderating Variables | Strength | Confidence |
|---|---|---|---|---|---|---|
| task manipulation | with the female candidate female evaluators willingness to work with the female candidate | the effect | partially mediated | Perceived niceness | $z = 4.82$ | $p < .001$ |
| femininity scores | propensity to negotiate | no direct correlation | | | | |
| Legitimacy of request | relational | positively correlated | | | $r = .40$ | |
| Legitimacy of request | deferential | positively correlated | | | $r = .43$ | |
| Legitimacy of request | Aggressive | negatively correlated | | | $r = -.37$ | |

Such extracted structured information results in the lexicon of behavioral variables. The lexicon is extendable to include future extracted information such as variable definitions, context, type of variable, and so on, hence resulting in a Behaviour Science dictionary. From the table 4 a few examples of such variables that can constitute the behavioral science dictionary are task manipulation, femininity scores, legitimacy of request, perceived niceness, propensity to negotiate, female evaluator's willingness to work with female candidates, male evaluator's willingness to work with female candidates, relational, deferential, and so on. Such behaviour variables, along with behaviour relations, abbreviations, hyponym-hypernym pairs can be used to form an ontology database (also referred to as an 'ontology framework'). For example, such an ontology database in behavioral science domain contain data associated with variables such as but not limited to 'negative outcomes', 'positive outcomes', and 'personality traits'. For example, 'anger' is one variable that leads to negative outcome. Similarly, 'ethical behavior' can lead to positive outcomes. The ontology framework being used is extendable and can include future extracted information such as context, variable definitions, synonym pairs, meronym-holonym pairs, and so on as shown in the Table 5. Table 6, Table 7, and Table 8 depict some examples of data that form the ontology framework. As can be seen in the tables 5, 6, 7, and 8, different parameters and their relations can be stored in the ontology framework.

TABLE 5

Extendable behavioral science ontology

| Details | Description | Format |
|---|---|---|
| Variable name | Name of the variable | String format (50 words) |
| *Definition | Definition of the variable | String format (300 words) |
| *Sub-domain | Sub-domain that variable falls under. | String format (20 words) |
| Relations | Relations with other variables such as unidirectional and bi-directional, bi-variate, multivariate, | Table format with each entry shows relations related to the variable {variables, Relations} |

TABLE 5-continued

Extendable behavioral science ontology

| Details | Description | Format |
|---|---|---|
| | qualitative and quantitative relations. | |
| Abbreviation | Abbreviations related to the variable | List of Abbreviations (n * 50 words) as string |
| Hyponyms | Hyponyms of the variable | List of hyponyms as string (n * 50 words) |
| Context | Different context in which variable is examined | String format (50 words) |
| Synonyms, | Synonyms of variable | List of synonyms as string (n * 50 words) |
| Holonym-Meronym pairs | Holonym-Meronym pairs related to the variable | List of Holonym-Meronym as string (n * 50 words) |

In table 5, the entries marked in italics are future work and 'n' indicates the count. The ontology framework can be extended to cover these parameters and associated data.

TABLE 6

| Variable | Positive outcomes | | |
|---|---|---|---|
| 1 | Positive outcomes | been associated with | trait self-control |
| 2 | Compliance | will lead to | positive outcomes |
| 3 | Internal locus of control | be associated with | positive outcomes |
| 4 | Ethical behaviors | be associated with | positive outcomes |
| 5 | Condition of racial diversity | alone didn't lead to | most positive outcomes |
| Hyponyms: | trust, commitment, and lower turnover intentions, inspiring innovative behavior among followers, job satisfaction, well-being, competitive advantage, performance, perceived risk reduction, satisfaction | | |
| Abbreviation | QOF: Quality and Outcomes Framework | | |

TABLE 7

| Variable | Negative outcomes | | |
|---|---|---|---|
| 1 | Anger | is associated with | negative outcomes |
| 2 | Concern of self | will lead to | negative outcomes |
| 3 | Suppression of anger | leads to | negative outcomes |
| 4 | External locus of control | be associated with | negative outcomes |
| 5 | Youth unemployment | is correlated with | negative outcomes |
| 6 | Lies | associated with | negative outcomes |
| 7 | Invisible support | was related to | negative outcomes |
| Hyponyms: | low job satisfaction, burnout, fatigue, depression, less time for leisure activities, less energy to devote to one's spouse and children, and deterioration of physical health, decreased productivity, eroded morale, hurt feelings and reputations, the turnover of valued employees, feelings of procedural injustice. | | |
| Abbreviation | QOF: Quality and Outcomes Framework | | |

TABLE 8

| Variable | Personality traits | | |
|---|---|---|---|
| 1 | Personality traits | also effect | acquired skills |
| 2 | Personality traits | also effect | knowledge |
| 3 | Personality traits | affect | earnings |
| 4 | Educational attainment | relationship complex | personality traits |
| 5 | Personality traits | be correlated to | cognitive skill |
| 6 | Job characteristics | themselves strongly related to | personality traits |
| 7 | Personality traits | are associated with | effective leadership styles |
| 8 | Personality traits | influence | wages |
| Hyponyms: | conscientiousness, emotional stability, and intellect, curiosity, ambition, and perseverance, self-esteem, leadership | | |
| Abbreviation | WECT: Work Experiences and Character Traits | | |

Figure 2:
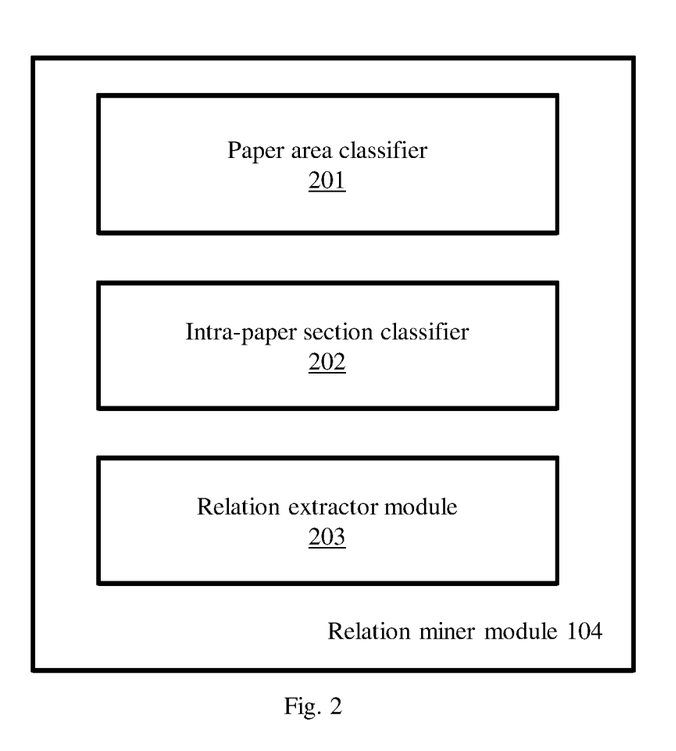
FIG. 2 is a functional block diagram depicting components of a relation miner module of the system of FIG. 1, according to some embodiments of the present disclosure.

FIG. 2 is a functional block diagram depicting components of a relation miner module of the system of FIG. 1, according to some embodiments of the present disclosure. The relation miner module 104 includes a paper area classifier 201, an intra-paper section classifier 202, and a relation extraction module 203.

The system 100 may collect quite a lot of reference papers as inputs for processing. However, not all of the collected reference papers may be relevant. The paper area classifier 201 is configured to classify the collected reference papers as 'relevant' or 'irrelevant'. The paper area classifier 201 classifies a reference paper as 'relevant' or 'irrelevant', by analyzing whole content of the reference paper or by analyzing contents in specific area (for example, abstract section) of the reference paper. The paper area classifier 201 may use one or more data models, generated by training the paper area classifier 201 using appropriate machine learning technique(s) by providing appropriate training data, to identify and classify relevant and irrelevant reference papers. The reference papers or documents classified as 'irrelevant' maybe discarded and only those which are classified as 'relevant' maybe processed further by the intra-paper classifier 202.

In each of the 'relevant' reference paper/document, not all sections may be containing relevant data. For example, in a reference paper, sections such as 'abstract' or 'summary' may contain data that can give crucial details about contents being addressed in the reference paper, whereas 'reference' section may not be as useful. The intra-paper classifier 202, by processing each of the reference papers, classifies sections within each of the reference papers as 'relevant' and 'irrelevant'. The intra-paper classifier 202 may use one or more data models, generated by training the intra-paper classifier 202 using appropriate machine learning technique(s) by providing appropriate training data, to identify and classify relevant and irrelevant sections in each reference papers. Further, only the 'relevant' sections of each of the reference papers or documents maybe further processed by the relation extractor module 203 to identify the qualitative and quantitative relations, and data from the 'irrelevant' sections may be discarded.

The relation extraction module 203 is configured to process the data from the relevant sections of each of the documents and identify and extract relations between different variables/parameters in the data being analyzed/processed. In various embodiments, the relation extraction module 203 identifies and extracts qualitative as well as quantitative relations between the variables/parameters. The relation extraction module 203 executes the process explained with description of FIG. 1, so as to extract the qualitative as well as quantitative relations between the variables/parameters.

FIG. 3 is a flow diagram depicting steps involved in the process of extracting data using the system of FIG. 1, in accordance with some embodiments of the present disclosure. The system 100 collects (302) a plurality of reference papers as inputs, from one or more sources, by using appropriate mechanism. For example, web crawlers may be used to collect the reference papers from websites and similar other sources. Each of the collected reference papers is initially classified (304) as 'relevant' or 'irrelevant'. The reference papers that are classified as 'irrelevant' are discarded (308). Further, each of the 'relevant' reference papers is processed further by the system 100 and all 'relevant' sections from each of the reference papers are identified (310).

Figure 3B:
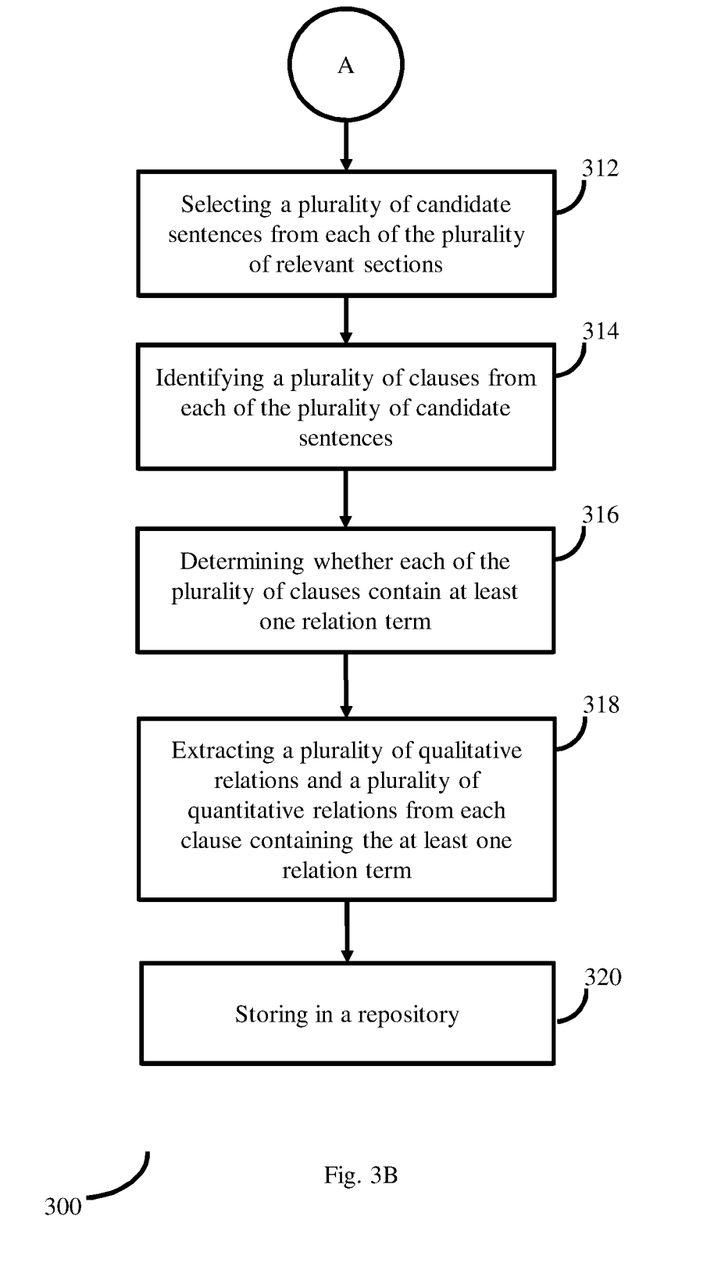

Further, from each of the relevant sections the system 100 selects (312) a plurality of candidate sentences. Further by processing each of the plurality of candidate sentences, the system 100 identifies (314) a plurality of clauses from each of the plurality of candidate sentences. The system 100 further checks each of the plurality of clauses to determine (316) presence of at least one relation term. Further, from each of the plurality of clauses containing the at least one relation term, the system 100 extracts (318) a plurality of qualitative relations and a plurality of quantitative relations, which may be stored (320) in a repository. The extracted domain concepts such as qualitative and quantitative relations can be used further to create domain dictionaries and ontologies. In various embodiments, one or more steps in method 300 can be skipped or omitted.

Figure 4:
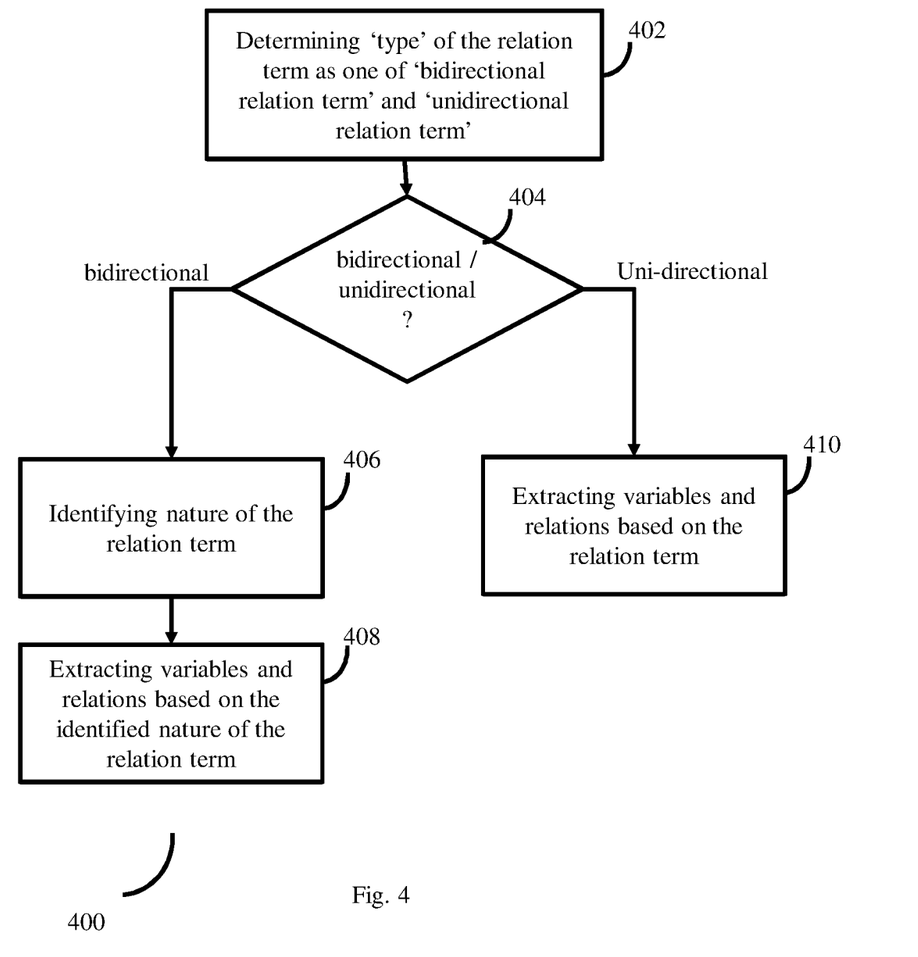
FIG. 4 is a flow diagram depicting steps involved in the process of extracting a plurality of qualitative relations, using the system of FIG. 1, in accordance with some embodiments of the present disclosure.

FIG. 4 is a flow diagram depicting steps involved in the process of extracting a plurality of qualitative relations, using the system of FIG. 1, in accordance with some embodiments of the present disclosure. In this process, the system 100 initially identifies (402) a 'type' of the relation term as one of 'bidirectional' or 'uni-directional'. If the relation term is bidirectional, then the system 100 identifies (406) 'nature' of the relation term and based on the identified nature of the relation term, extracts (408) variables and relations. If the relation term is uni-directional, then the system 100 extracts (408) variables and relations based on the relation term directly without considering nature of the relation term. In various embodiments, one or more steps in method 400 can be skipped or omitted.

Figure 5:
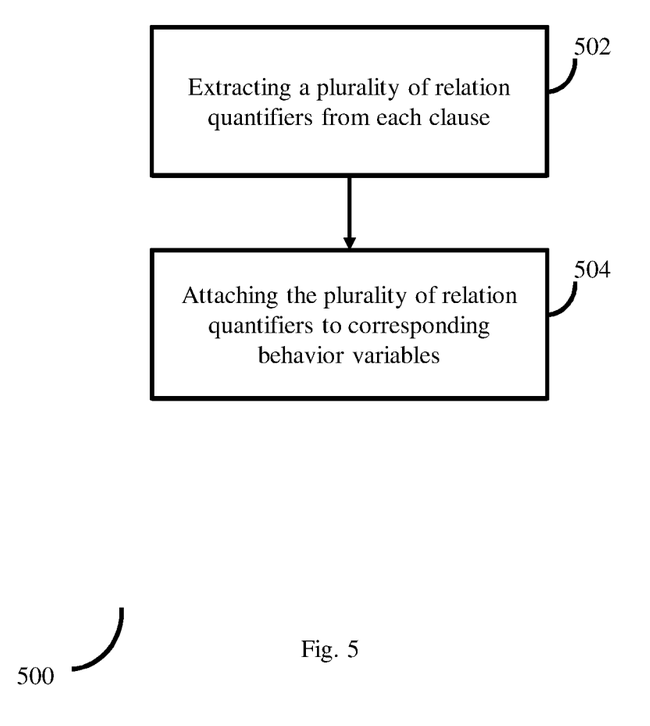
FIG. 5 is a flow diagram depicting steps involved in the process of extracting a plurality of quantitative relations, using the system of FIG. 1, in accordance with some embodiments of the present disclosure.

FIG. 5 is a flow diagram depicting steps involved in the process of extracting a plurality of quantitative relations, using the system of FIG. 1, in accordance with some embodiments of the present disclosure. In this process, the system 100 initially extracts (502) a plurality of relation quantifiers from each of the identified clauses. Further the system 100 attaches (504) the plurality of relation quantifiers to corresponding behavior variables. In various embodiments, one or more steps in method 500 can be skipped or omitted.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor implemented method for data extraction, comprising:
    collecting a plurality of reference papers from at least one associated source, using at least a plurality of crawlers, via one or more hardware processors;
    preprocessing a training data to obtain a preprocessed training data, by:
        converting the training data into lower case;
        removing whitespace, punctuations, and commonly occurring words; and
        stemming each word in the training data to a root form;
    training a paper area classifier and an intra-paper classifier using the preprocessed training data;
    classifying, by the paper area classifier, the plurality of reference papers as relevant or irrelevant based on the preprocessed training data, via the one or more hardware processors, wherein the paper area classifier analyzes contents in an abstract or a summary of the plurality of reference papers to identify and classify the plurality of reference papers as relevant or irrelevant, and wherein the plurality of reference papers that are classified as irrelevant are discarded;
    for each relevant reference paper:
        identifying, by the intra-paper classifier, a plurality of relevant sections in the relevant reference paper based on Frequency-Inverse Document Frequency (TF-Idf) technique, via the one or more hardware processors, wherein the intra-paper classifier splits each relevant reference paper into multiple sections and identifies sections within each of the relevant reference papers as a relevant section or an irrelevant section, based on the preprocessed training data;
        pre-processing the plurality of relevant sections, via the one or more hardware processors, by performing abbreviation expansions, co-reference resolution, hypernym-hyponym replacements, conversion of complex sentences within the relevant sections into simple sentences, and cleaning of special characters,
            wherein the abbreviation expansion is performed by identifying patterns of occurrences of the abbreviation and their respective expansion pairs,
            wherein the co-reference resolution is performed by identifying and resolving mentions within the plurality of relevant sections using Stanford Corenlp parser,
            wherein the hypernym-hyponym replacements is performed by identifying the hyponyms stated using specific phrases across the plurality of relevant sections, and by replacing a candidate set created for the hypernym-hyponym replacements, and
            wherein the abbreviation expansion and the hypernym-hyponym replacements use lexicon syntactic patterns made up of a combination of keywords and the special characters; and
        processing the pre-processed plurality of relevant sections, via the one or more hardware processors, comprising:
            selecting a plurality of candidate sentences from each pre-processed relevant section;
            identifying a plurality of clauses from each of the plurality of candidate sentences;
            determining at least one relation term in each of the plurality of clauses, wherein the relation term is at least one of a bidirectional term or a uni-directional term; and extracting a plurality of qualitative relations and a plurality of quantitative relations from each clause determined as containing the at least one relation term,
> wherein the plurality of qualitative relations is extracted by identifying a type of a relation statement by considering a position of the relation term in the relation statement, wherein the relation statement indicates a bivariate or a multivariate relation defined between variables,
> wherein the plurality of quantitative relations is extracted by determining strength, confidence, and mean values of the relation statement using a syntactic dependency parsing and the lexicon syntactic patterns, and
> wherein the extracted plurality of qualitative relations and the plurality of quantitative relations are used to create domain dictionaries and ontologies.

2. The method as claimed in claim 1, wherein extracting the plurality of qualitative relations comprising:
determining type of the at least one relation term as one of the bidirectional term or the uni-directional term;
for the bidirectional relation term:
identifying nature of the relation term; and
extracting variables and relations based on the identified nature of the relation term; and
for the uni-directional relation term:
extracting the variables and relations between the variables based on the relation term.

3. The method as claimed in claim 1, wherein extracting the plurality of quantitative relations comprising:
processing each clause, comprising:
extracting a plurality of relation quantifiers from the clause; and
attaching the plurality of relation quantifiers to corresponding variables.

4. A system for data extraction, comprising:
one or more hardware processors;
one or more communication interfaces;
a relation miner module; and
one or more memory modules storing a plurality of instructions, wherein the plurality of instructions when executed cause the one or more hardware processors to:
collect a plurality of reference papers from at least one associated source, using at least a plurality of crawlers;
preprocess a training data to obtain a preprocessed training data, by:
converting the training data into lower case;
removing whitespace, punctuations, and commonly occurring words; and
stemming each word in the training data to a root form;
train a paper area classifier and an intra-paper classifier using the preprocessed training data;
classify, by the paper area classifier, the plurality of reference papers as relevant or irrelevant based on the preprocessed training data, wherein the paper area classifier analyzes contents in an abstract or a summary of the plurality of reference papers to identify and classify the plurality of reference papers as relevant or irrelevant, and wherein the plurality of reference papers that are classified as irrelevant are discarded;
for each relevant reference paper:
identify, by the intra-paper classifier, a plurality of relevant sections in the relevant reference paper based on Frequency-Inverse Document Frequency (Tf-Idf) technique, wherein the intra-paper classifier splits each relevant reference paper into multiple sections and identifies sections within each of the relevant reference papers as a relevant section or an irrelevant section, based on the preprocessed training data;
pre-process the plurality of relevant sections, via the one or more hardware processors, by performing abbreviation expansion, co-reference resolution, hypernym-hyponym replacements, conversion of complex sentences within the relevant sections into simple sentences, and cleaning of special characters,
> wherein the abbreviation expansion is performed by identifying patterns of occurrences of the abbreviation and their respective expansion pairs,
> wherein the co-reference resolution is performed by identifying and resolving mentions within the plurality of relevant sections using Stanford Corenlp parser,
> wherein the hypernym-hyponym replacements is performed by identifying the hyponyms stated using specific phrases across the plurality of relevant sections, and by replacing a candidate set created for the hypernym-hyponym replacements, and
> wherein the abbreviation expansion and the hypernym-hyponym replacements use lexicon syntactic patterns made up of a combination of keywords and the special characters; and
process the pre-processed plurality of relevant sections, by:
selecting a plurality of candidate sentences from each pre-processed relevant section;
identifying a plurality of clauses from each of the plurality of candidate sentences;
determining at least one relation term in each of the plurality of clauses using the relation miner module, wherein the relation term is at least one of a bidirectional term or a uni-directional term; and
extracting a plurality of qualitative relations and a plurality of quantitative relations from each clause determined as containing the at least one relation term using the relation miner module,
> wherein the plurality of qualitative relations is extracted by identifying a type of a relation statement by considering a position of the relation term in the relation statement, wherein the relation statement indicates a bivariate or a multivariate relation defined between variables,
> wherein the plurality of quantitative relations is extracted by determining strength, confidence, and mean values of the relation statement using a syntactic dependency parsing and the lexicon syntactic patterns, and
> wherein the extracted plurality of qualitative relations and the plurality of quantitative relations are used to create domain dictionaries and ontologies.

5. The system as claimed in claim 4, wherein the system extracts the plurality of qualitative relations by:
   determining type of the at least one relation term as one of the bidirectional term or the uni-directional term;
   for the bi-directional relation term:
      identifying nature of the relation term; and
      extracting variables and relations based on the identified nature of the relation term; and
   for the uni-directional relation term:
      extracting the variables and relations between the variables based on the relation term.

6. The system as claimed in claim 4, wherein the system extracts the plurality of quantitative relations by:
   processing each clause, comprising:
      extracting a plurality of relation quantifiers from the clause; and
      attaching the plurality of relation quantifiers to corresponding variables.

7. A non-transitory computer readable medium embodying a program executable in a computing device for data extraction, comprising:
   collecting a plurality of reference papers from at least one associated source, using at least a plurality of crawlers, via one or more hardware processors;
   preprocessing a training data to obtain a preprocessed training data, by:
      converting the training data into lower case;
      removing whitespace, punctuations, and commonly occurring words; and
      stemming each word in the training data to a root form;
   training a paper area classifier and an intra-paper classifier using the preprocessed training data;
   classifying, by the paper area classifier, the plurality of reference papers as relevant or irrelevant based on the preprocessed training data, via the one or more hardware processors, wherein the paper area classifier analyzes contents in an abstract or a summary of the plurality of reference papers to identify and classify the plurality of reference papers as relevant or irrelevant, and wherein the plurality of reference papers that are classified as irrelevant are discarded;
   for each relevant reference paper:
      identifying, by the intra-paper classifier, a plurality of relevant sections in the relevant reference paper based on Frequency-Inverse Document Frequency (Td-Idf) technique, via the one or more hardware processors, wherein the intra-paper classifier splits each relevant reference paper into multiple sections and identifies sections within each of the relevant papers as a relevant section or an irrelevant section, based on the preprocessed training data;
      pre-processing the plurality of relevant sections, via the one or more hardware processors, by performing abbreviation expansion, co-reference resolution, hypernym-hyponym replacements, conversion of complex sentences within the relevant sections into simple sentences, and cleaning of special characters,
         wherein the abbreviation expansion is performed by identifying patterns of occurrences of the abbreviation and their respective expansion pairs,
         wherein the co-reference resolution is performed by identifying and resolving mentions within the plurality of relevant sections using Stanford Corenlp parser,
         wherein the hypernym-hyponym replacements is performed by identifying the hyponyms stated using specific phrases across the plurality of relevant sections, and by replacing a candidate set created for the hypernym-hyponym replacements, and
         wherein the abbreviation expansion and the hypernym-hyponym replacements use lexicon syntactic patterns made up of a combination of keywords and the special characters; and
   processing the plurality of pre-processed relevant sections, via the one or more hardware processors, comprising:
      selecting a plurality of candidate sentences from each relevant section;
      identifying a plurality of clauses from each of the plurality of candidate sentences;
      determining at least one relation term in each of the plurality of clauses, wherein the relation term is at least one of a bidirectional term or a uni-directional term; and
      extracting a plurality of qualitative relations and a plurality of quantitative relations from each clause determined as containing the at least one relation term,
      wherein the plurality of qualitative relations is extracted by identifying a type of a relation statement by considering a position of the relation term in the relation statement, wherein the relation statement indicates a bivariate or a multivariate relation defined between variables,
      wherein the plurality of quantitative relations is extracted by determining strength, confidence, and mean values of the relation statement using a syntactic dependency parsing and the lexicon syntactic patterns, and
      wherein the extracted plurality of qualitative relations and the plurality of quantitative relations are used to create domain dictionaries and ontologies.

8. The non-transitory computer readable medium as claimed in claim 7, wherein extracting the plurality of qualitative relations comprising:
   determining type of the at least one relation term as one of the bidirectional term or the uni-directional term;
   for the bidirectional relation term:
      identifying nature of the relation term; and
      extracting variables and relations based on the identified nature of the relation term; and
   for the uni-directional relation term:
      extracting the variables and relations between the variables based on the relation term.

9. The non-transitory computer readable medium as claimed in claim 7, wherein extracting the plurality of quantitative relations comprising:
   processing each clause, comprising:
      extracting a plurality of relation quantifiers from the clause; and
      attaching the plurality of relation quantifiers to corresponding variables.

* * * * *